April 30, 1957 A. A. GEDDE ET AL 2,790,643

MAGNETIC TAPE RECORDING AND PLAY-BACK MACHINE

Filed March 31, 1951 7 Sheets-Sheet 1

Inventors.
Andrew A. Gedde
John S. Moyer
By John F. Eakins
Attorney

April 30, 1957 A. A. GEDDE ET AL 2,790,643

MAGNETIC TAPE RECORDING AND PLAY-BACK MACHINE

Filed March 31, 1951 7 Sheets-Sheet 2

Inventors
Andrew A. Gedde
John S. Moyer
By John F. Eakins
Attorney

MAGNETIC TAPE RECORDING AND PLAY-BACK MACHINE

Filed March 31, 1951 7 Sheets-Sheet 3

Inventors
Andrew A. Gedde
John S. Moyer
By John F. Eakins
Attorney

Inventors
Andrew A. Gedde
John S. Moyer
By John F. Eakins
Attorney

MAGNETIC TAPE RECORDING AND PLAY-BACK MACHINE

Filed March 31, 1951 7 Sheets-Sheet 5

Inventors
Andrew A. Gedde
John S. Moyer
By John F. Eakin
Attorney

MAGNETIC TAPE RECORDING AND PLAY-BACK MACHINE

Filed March 31, 1951 7 Sheets-Sheet 6

Inventors
Andrew A. Gedde
John S. Moyer
By John F. Eakins
Attorney

MAGNETIC TAPE RECORDING AND PLAY-BACK MACHINE

Inventors
Andrew A. Gedde
John S. Moyer
By John F. Eakins
Attorney 2,790,643

MAGNETIC TAPE RECORDING AND PLAY-BACK MACHINE

Andrew A. Gedde, Milton Township, Du Page County, and John S. Moyer, Chicago, Ill., assignors, by mesne assignments, to Fort Pitt Industries, Incorporated, Pittsburgh, Pa., a corporation of Pennsylvania Application March 31, 1951, Serial No. 218,614

6 Claims. (Cl. 274—4)

This invention relates to a magnetic tape recording and play-back machine and more particularly to such a machine which is adapted to create and/or play back from two sound tracks on the magnetic tape.

In such a machine, it is preferred to apply the signal to one track on the tape while the tape is moving in one direction and to apply the signal to the other track when reverse movement of the tape is taking place. The principal object of the present invention is to provide a machine in which the drive of the tape and the recording or play-back means is reversed instantaneously so that substantially no interruption of the signal is caused by transferring the operation from one track to the other. We attain this object by driving the tape by means of two capstans. The capstans and the motor which drives them are continuously in operation. Only one of the capstans is rendered operative by means of a gripper which holds the tape against the capstan. Consequently, by releasing one gripping means and bringing the other gripping means into operation, which can be effected instantaneously, the direction of movement of the tape is immediately reversed.

The tape is stored upon two reels, both of which tend to drive in tape takeup direction. These drives are frictional so that the force applied by the reels on the tape is insufficient to affect the capstan drive of the tape.

A further object of the invention is to provide an improved drive for the reels, whereby either reel may be driven at high speed for rapid transfer of tape from one to the other, the capstans being inoperative and whereby the force applied to the takeup reel may be increased when either capstan is operative and the force applied by the supplying reel to the tape is reduced.

A further object of the invention is to provide an improved recording or pickup head assembly whereby the appropriate recording or pickup magnet and preferably also an erase magnet is brought into operation for cooperation with the appropriate sound track or sound track location when one capstan or the other is rendered operative.

Other objects, advantages, and capabilities of the invention will appear from the following description of a preferred embodiment of the invention, taken in conjunction with the accompanying drawing in which.

Figure 1:
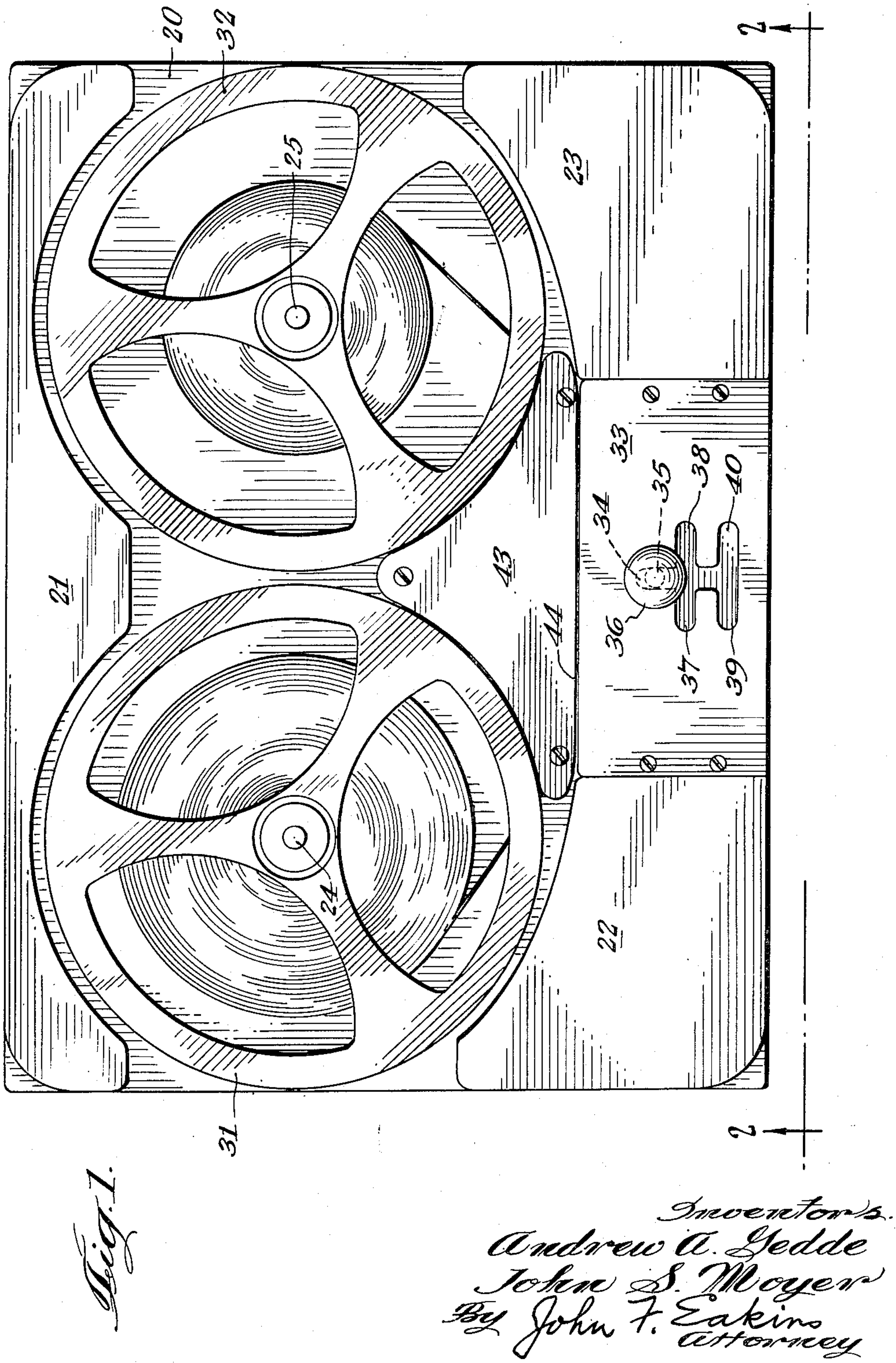
Figure 1 is a plan view of a machine embodying our invention.

Referring to the drawings, the machine comprises a main base plate 20, which is preferably a casting of generally flat form. The casting includes formations 21, 22 and 23 which substantially surround and are flush with the reels 31 and 32 when mounted in position as shown in Fig. 1. The reels are mounted on spindles 24 and 25 which project upwardly through the casting and each spindle is provided with a disc 26 (Figs. 3 and 4) to support its reel. Each disc 26 is provided with an upward projection 27 which enters a recess in the reel so that the reel is caused to rotate with the spindle. Each spindle 24 and 25 is mounted in a boss 28 formed on the base plate 20 and carries on the underside of the base plate a pulley 29 and 30, respectively.

Between the formations 22 and 23, and mounted thereon is a cover plate 33. This cover plate is provided with a central longitudinal slot 34 which normally receives a post 35 provided at its upper end with a handle 36. Normally, the post 35 is in a rearward position in the slot 34 as shown in Fig. 1. At an intermediate position, the slot 34 gives into a left hand slot 37 and a right hand slot 38. The foremost end of the slot 34 gives into a left hand slot 39 and a right hand slot 40.

It may here be noted that when the handle is moved forwardly, the motor is started. When the post 35 is moved to the left into the slot 39, a capstan drive is put into operation to feed tape from the reel 32 to the reel 31 and the reel 31 is driven by a friction drive so as to take up the tape moving to the left. When the post 35 is moved into the slot 40, another capstan drive is rendered effective to feed tape to the right from the reel 31 and the reel 32 is driven by a friction drive to take up the tape thus supplied to it.

When the post 35 is moved into the slot 37, no capstan drive operates on the tape and the reel 31 is driven at high speed in the clockwise direction so as to transfer tape rapidly to it from the reel 32. Likewise, when the post 35 is moved into the slot 38, no capstan drive is operative on the tape and the reel 32 is driven at high speed so as to take up tape from the reel 31. By way of example, the capstan drives may drive the tape at about 16 feet per minute, whereas the reels 31 and 32 may be driven at several hundred revolutions per minute. It may be noted that the supplying reel is always subjected to a relatively slight braking force so that termination of the drive of either reel by movement of the post 35 into a central position, results in the immediate arrestment of both reels and the tape. When the post 35 is moved into its rearward position in the slot 34, as shown in Fig. 1, the motor is stopped and the post 34 is latched into this rearward position, keeping the machine out of operation.

The capstans are obscured in Fig. 1 by a removable cover plate 43. A slot 44 between the plate 43 and the cover plate 33 enables the tape between the reels to be inserted to engage the capstans during loading.

Figures 2, 13, 14, 15:
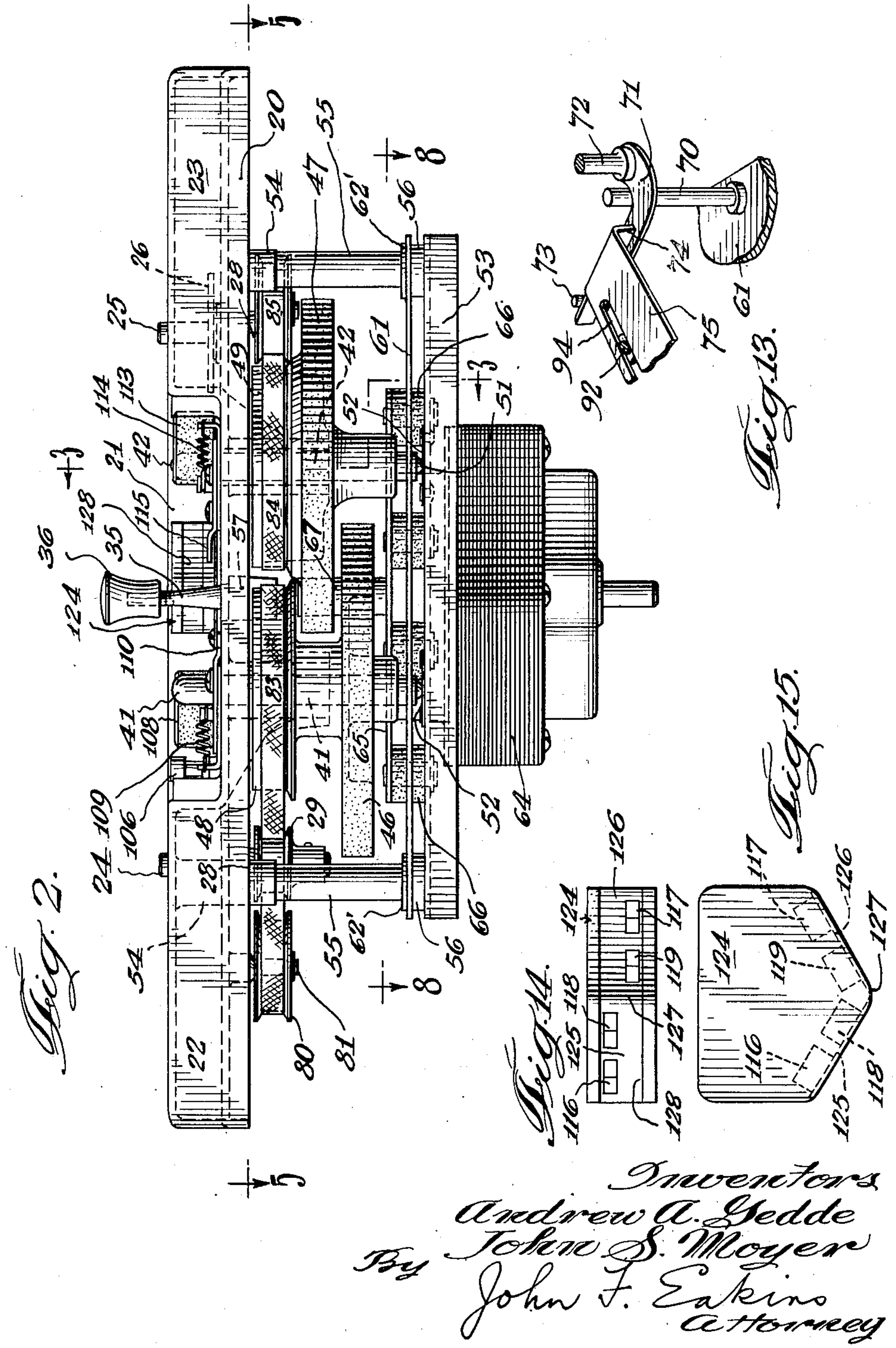
Fig. 2 is a front elevational view thereof, as viewed on the line 2—2 of Fig. 1.
Fig. 13 is a perspective view illustrating the elements which effect displacement of the motor.
Fig. 14 is a front elevational view.
Fig. 15 is a plan view, of the magnet assembly on a larger scale, showing the location of the magnets therein.
Figure 4:
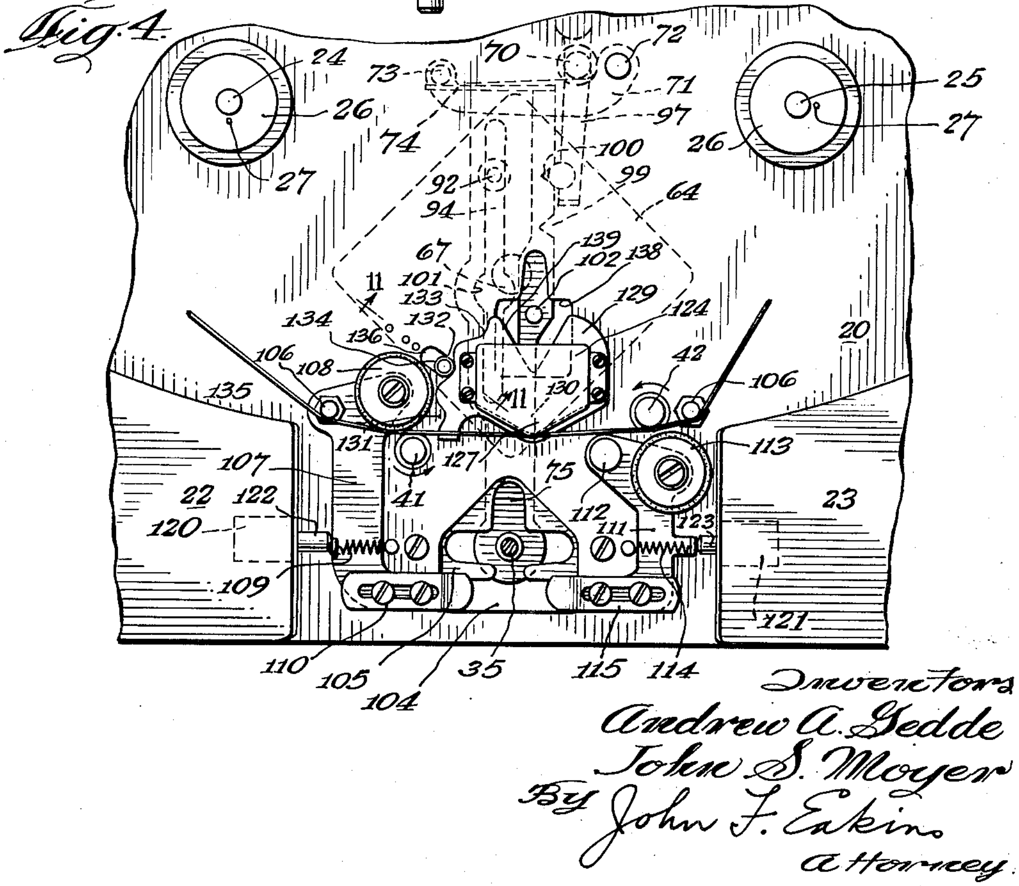
Fig. 4 is a fragmentary plan view of the center forward part of the machine with covered plates removed and the control element in neutral, partially advanced condition with the motor operative.
Figures 5, 5A:
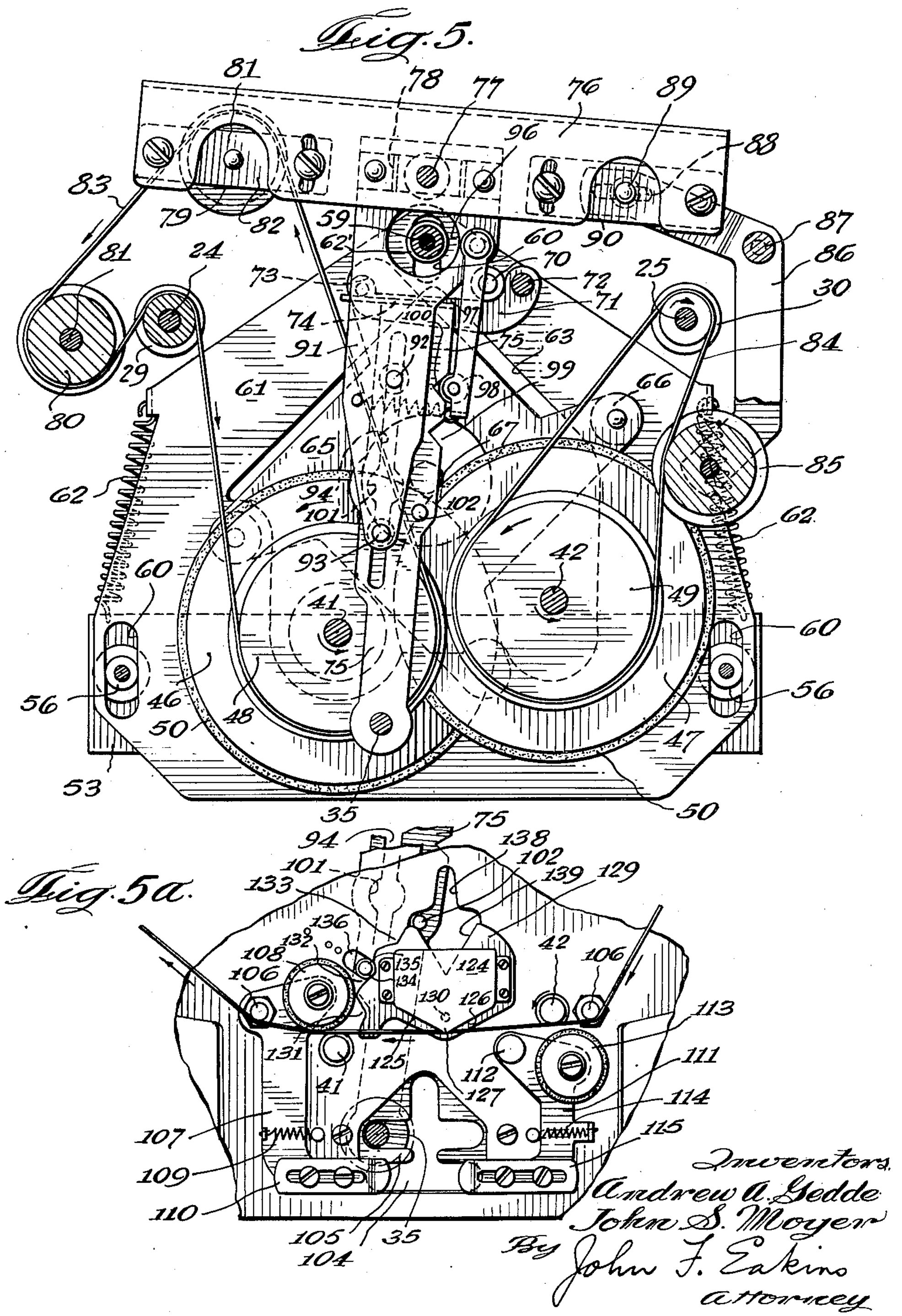
Fig. 5 is a sectional plan view taken on the line 5—5 of Fig. 2, showing the control element positioned for fast transfer of tape from the right hand to the left hand reel.
Fig. 5a is a view similar to Fig. 4, the control member being located in its position of Fig. 5.
Figures 9, 10, 11, 12:
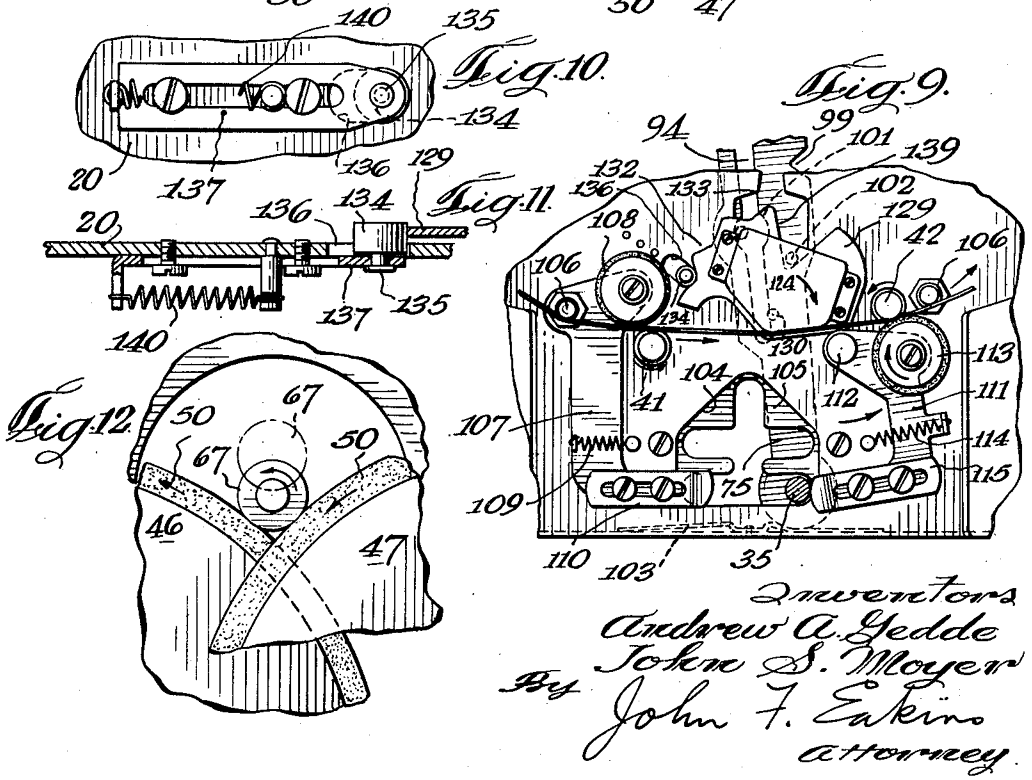
Fig. 9 is a view similar to Fig. 4, showing the control member positioned for capstan drive of tape from the left to the right hand reel.
Fig. 10 is a fragmentary inverted plan view showing the mounting of a spring biassed roller which cooperates with the magnet head assembly.
Fig. 11 is a longitudinal section through the elements of Fig. 10.
Fig. 12 is a fragmentary plan view illustrating the manner in which the motor pinion operatively engages the two driving elements with which it is associated.

The capstans 41 and 42 (Figs. 3 and 4) are rotatably mounted in long bearings provided by bosses 45 (Fig. 3) on the underside of the plate 20 and extend above the plate to cooperate with the tape in the general plane of the reels 31 and 32. Below the boss 45, the capstan 42 has rigidly secured thereto, a casting which comprises a driving wheel 47 and a pulley 49. The capstan 41 has likewise rigidly secured thereto, a casting which provides a driving wheel 46 and a pulley 48. Both driving wheels 46 and 47 are provided with rubber tires 50. The pulleys 48 and 49 are located in the same horizontal plane, but the driving wheel 47 is higher than the driving wheel 46 so that they overlap as shown in Figs. 2, 5 and 12. The lower ends of the capstans 41 and 42 are internally coned to receive bearing balls 51 which rest upon the hardened plates 52 carried by a bridge piece 53. The bridge piece 53 is horizontal and is bolted to two bosses 54 which depend from the base plate 20. A tubular spacer 55 and a shouldered washer 56 are associated with each boss 54 and these elements hold the bridge piece 53 at proper position.

The base plate 20 is provided with a depending boss 57 centrally and towards the rear side of the base plate. A bracket 58 is bolted to the boss 57 with the aid of a tubular spacer 59. The lower end of the spacer 59 is reduced in diameter and is coplanar with the reduced portions of the washers 56. The reduced portions of the washers 56 and spacer 59 are received in the slots 60 of a motor carrying plate 61 which is of general triangular figuration. Three washers 62′ engage the upper side of the plate 61 and hold it in horizontal position. It may be noted that the slots 60 run in fore and aft direction so that the plate 61 may be moved forwardly and rearwardly. The plate 61 is biassed forwardly by the springs 62 connected to it and to the bridge piece 53. The plate 61 is provided with an opening 63 for the reception of a motor 64 which is mounted on the plate 61 with the aid of a mounting plate 65 rigidly secured to the motor, and grommets 66, suitably of rubber. The driving pinion 67 of the motor 64 projects upwardly past the driving wheels 46 and 47. When the plate 61 is freed, the springs 62 move the motor forwardly, bringing the pinion 67 into operative engagement with both driving wheels 46 and 47. The capstans 41 and 42 are thereby driven in the same direction, which is the counterclockwise direction as viewed from above.

The bracket 58 carries the motor switch 68, which has a plunger 69 located to be engaged by the motor 64. When the motor 64 moves forwardly, the plunger 69 projects, closing the switch 68 and starting the motor. When the motor is moved back, as a result of backward movement of the handle 36 so as to bring the post 35 into its position in Fig. 1, the plunger 69 is moved rearwardly and the switch 68 is opened. It is to be noted that when this occurs, the driving pinion 67 is moved away from the wheels 46 and 47 as shown by its phantom position in Fig. 12. Thus, the pinion 67 cannot form depressions in the tires 50 of the wheels 46 and 47 when the machine is out of operation for long periods.

The motor mounting plate 61 carries an upwardly projecting pin 70 which is arranged to be engaged by a lever 71 pivotally mounted on a stud 72 depending from the base plate 20. The lever 71 carries an upstanding pin 73 which is arranged to be engaged by a flange 74 turned down at the rear end of a sliding member 75.

Figures 6, 6A:
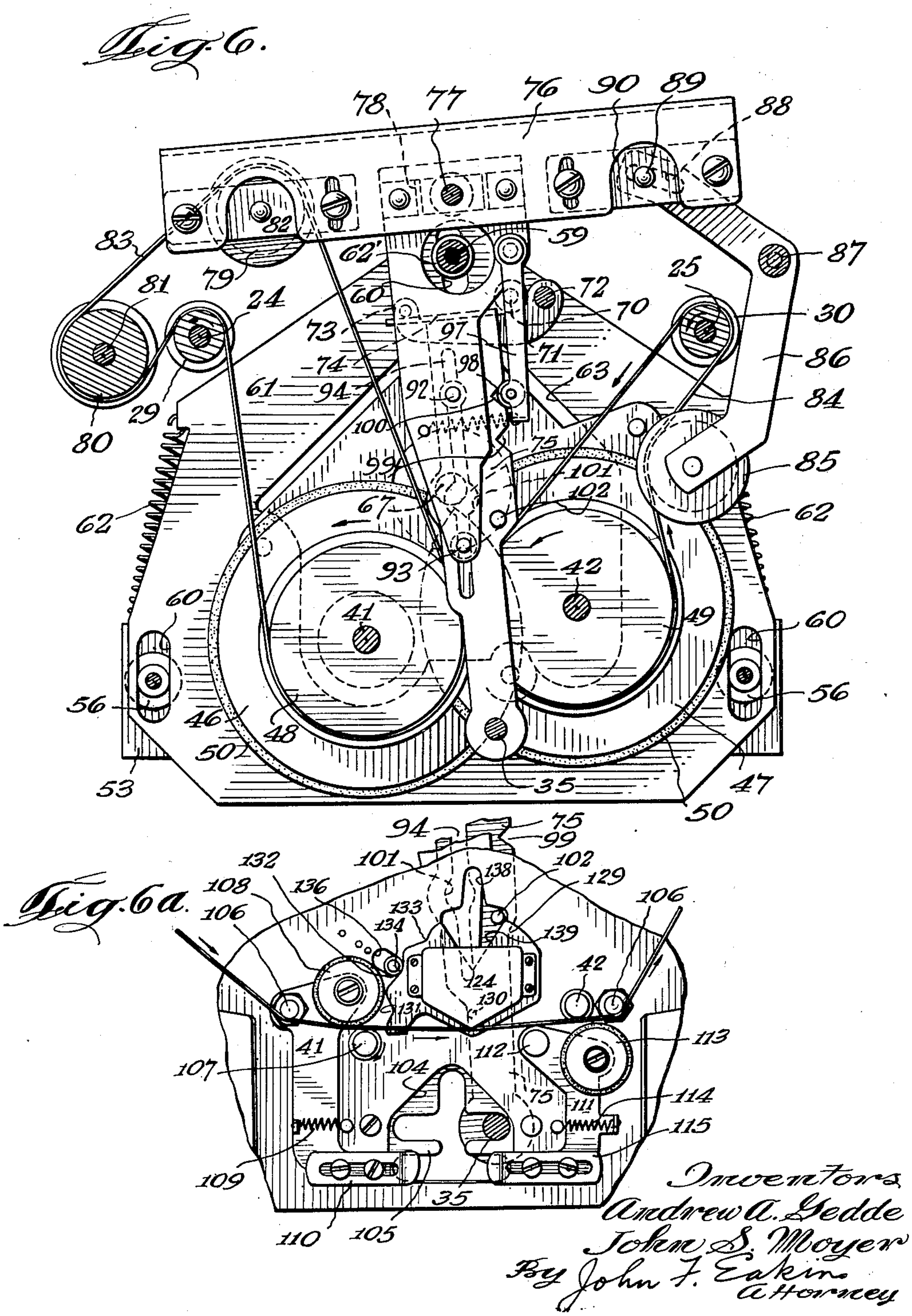
Fig. 6 is a view similar to Fig. 5 with the control element positioned for fast transfer of tape from the left hand to the right hand reel.
Fig. 6a is a view similar to Fig. 4, the control member being located in its position in Fig. 6.
Figures 7, 7A:
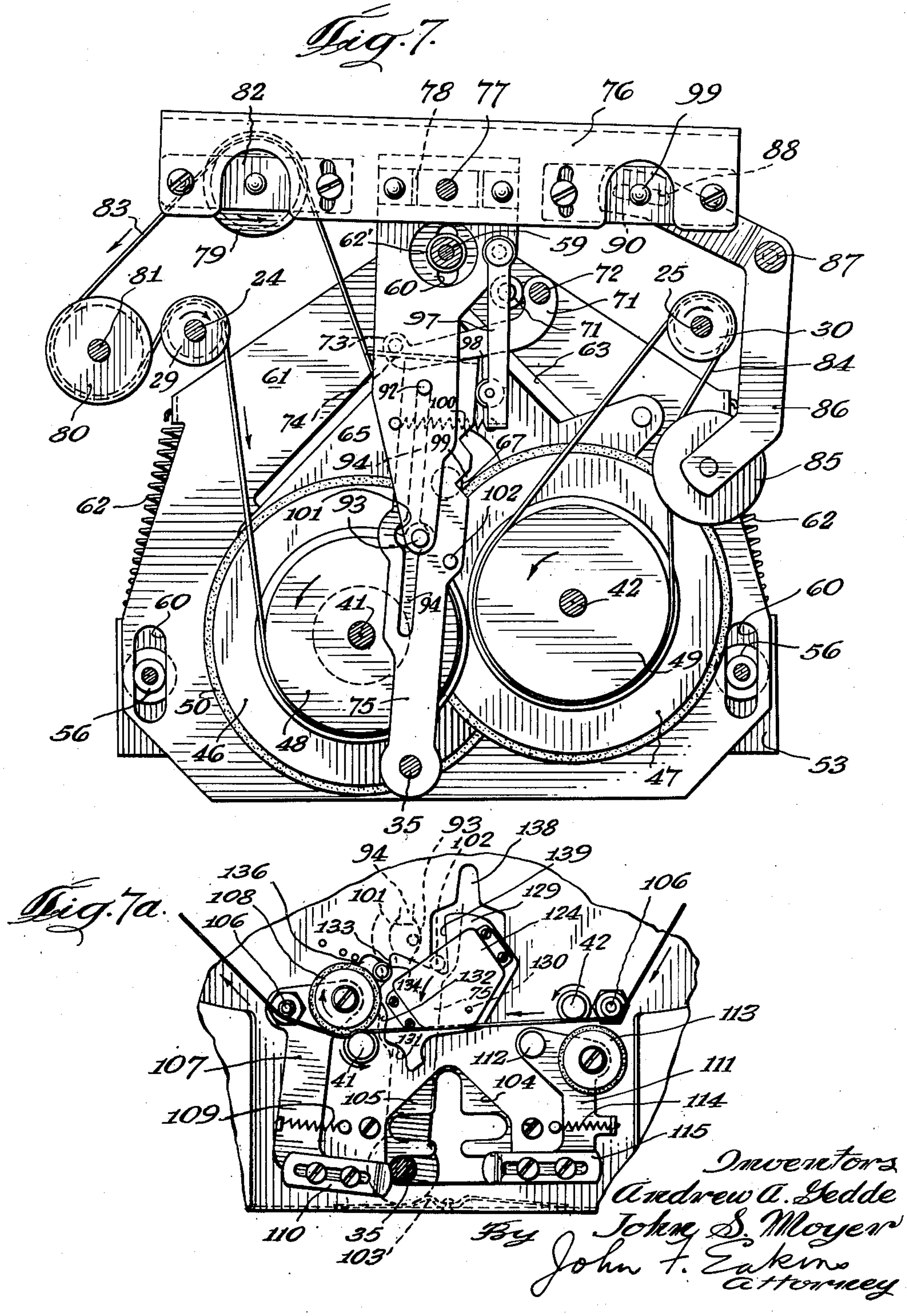
Fig. 7 is a view similar to Fig. 5 showing the control member in position for recording or play-back with the tape moving from the right hand to the left hand reel.
Fig. 7a is a view similar to Fig. 4, the control member being located in its position in Fig. 7.
Figure 8:
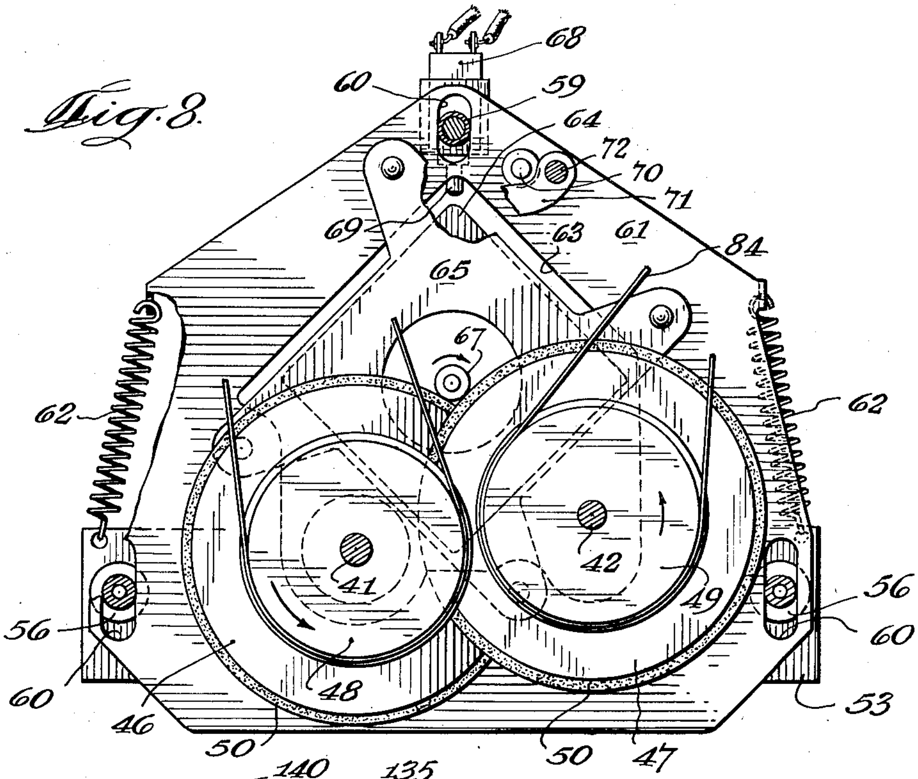
Fig. 8 is a sectional plan view taken on the line 8—8 of Fig. 2.

A member 76 is pivotally mounted at its center on a stud 77 depending from the plate 20 near its rear edge. The member 76 carries a depending yoke 78 to provide a long bearing for said member. At one end, the member 76 carries a pulley 79 in coplanar relation to the pulleys 48 and 29, and an idler pulley 80 mounted on a stud 81 depending from the plate 20. The pulley 79 is mounted on a bar 82 which is secured to the member 76 by screws, one of which operates in a slot in the member 76 to provide for tension adjustment of a belt 83 which passes around the pulleys 48, 29, 80 and 79, as shown in Figs. 5, 6 and 7. Another belt 84 passes around pulleys 49 and 30. Its outer length is engaged and deflected inwardly by a pulley 85 carried by a lever 86 which is pivotally mounted on a stud 87 depending from the plate 20. The other end of the lever 86 is provided with a slot 88 which receives a pin 89 depending from the other end of the member 76. The pin 89 is carried by a bar 90 which is secured to the member 76 by screws, one of which is located in a slot in the member 76 to enable the tension of the belt 84 to be adjusted.

The belts 83 and 84 may suitably be made from woven cotton fabric and their normal tensions are equalized so that when the member 76 is in its normal position substantially parallel to the rear edge of the machine, and the motor is operating and driving the pulleys 29 and 30 in opposite directions, the belts slips over these pulleys applying approximately equal frictional forces thereto so that the tape is not driven or is driven at a negligible speed. The tension on the belts is further adjusted so that when the member 76 is deflected in the clockwise direction, to the maximum degree as shown in Fig. 5, the tension on the belt 83 is increased to prevent slippage over the pulley 29 and the tension of the belt 84 is reduced to maximum degree while still preserving a frictional force on the pulley 30, sufficient to keep the tape taut. Likewise, when the member 76 is deflected to maximum degree in the counterclockwise direction, as viewed in Fig. 6, the tension on the belt 84 is increased to prevent slippage between the belt 84 and the pulley 30, and the tension of the belt 83 is decreased to permit slippage of that belt over the pulley 29 while still exerting frictional force thereon sufficient to maintain the tape taut. When the member 76 is returned to its normal position, the tensions are again equalized and both reels stop immediately.

It may here be noted that the member 76 is deflected to maximum degree when the post 35 is moved into the slot 37 or the slot 38 for fast transfer of tape from one reel to the other. When the post 35 is moved into slot 39, the member 76 is deflected to a lesser degree slightly increasing the tension of the belt 83 and decreasing the tension of the belt 84. At this time, as shown in Fig. 7*a*, the capstan 41 is effective to transfer the tape from reel 32 to reel 31. The belt 83 drives the reel 31 to take up the tape while the belt 84 applies sufficient force to the reel 32 to maintain the tape taut. When the post 35 is moved into the slot 40, the condition is reversed. The tape is fed to the right by the capstan 42, the reel 32 is driven by the belt 84 to take up the transferred tape and the belt 83 slipping over the pulley 29 applies sufficient force to the reel 31 to keep the tape taut. It may here be noted that when either capstan is effective, the drive of the tape is positive and the movement of the tape is unaffected by the slight tensions applied thereto by the belts 83 and 84.

The deflections of the member 76 are effected by a forwardly directed arm 91 rigidly secured to the member 76 at its center. The arm 91 serves as a support for the sliding member 75 which carries the post 35. The arm 91 carries depending headed studs 92 and 93 which extend downwardly through a slot 94 in said member 75. The forward end of the member 75 is also supported by a bridge piece 95 mounted on the underside of the plate 20.

The arm 91 is provided with an enlarged opening 96 to accommodate boss 57. The arm 91 has pivotally mounted thereon, a spring biassed lever 97 which carries a roller 98. This roller bears against the right hand edge of the member 75. This edge is provided with two notches 99 and 100. When the post 35 is in central position, and is moved rearwardly into the slot 34, the roller 98 is received in the notch 99 and the member 75 is thereby latched in its rearward position, holding the motor in its rearward position with the switch 68 open. When the member 75 is moved forwardly, so that the roller 98 seats in the notch 100, the post 35 is in register with the slots 37 and 38 so that this post may readily be introduced into one slot or the other to provide the major deflections of the member 76 previously referred to. When the member 75 is moved forwardly to maximum extent, to enable the post 35 to enter slot 39 or 40, the stud 93 becomes located in an enlargement 101 of the slot 94, providing a degree of free movement between the member 75 and the arm 91. Consequently, when the post 35 is moved into the slot 39 or 40, the member 76 is subjected to a lesser deflection as shown in Fig. 7. The member 75 is provided with an upstanding pin 102, the purpose of which will hereinafter be described.

Figure 3:
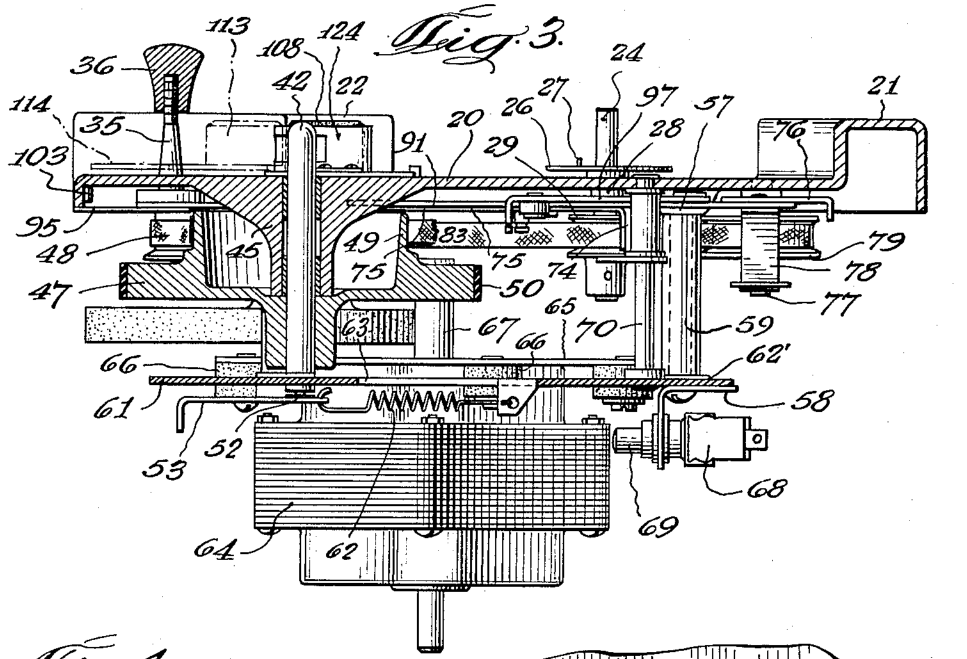
Fig. 3 is a sectional view taken on the broken line 3—3 of Fig. 2.

A double humped leaf spring 103 is mounted on the inner side of the front lip of the plate 20 as shown in Figs. 3, 7*a* and 9. When the post 35 is drawn out to its greatest extent, the forward end of the member 75 engages this spring and when the post 35 is moved into either of the slots 39 or 40, the spring holds it in this position. The post 35 projects upwardly through an opening 104 and a plate 105, provided with slots in register with the slots 34 to 40, may be secured below this opening.

Referring more particularly to Figs. 4, 5*a*, 6*a*, 7*a* and 9, it will be noted that the left hand capstan 41 is located forwardly of the right hand capstan 42 and that the tape passes behind the former and in front of the latter. The tape also passes in front of posts 106 to the left and right of the capstans. A lever 107 is pivotally mounted on the upper side of the plate 20. This lever carries a rubber tired idler 108 which is arranged to move into contact with the capstan 41. The idler 108 is located on the other side of the tape from the capstan 41 so that the tape can be gripped between these two elements. The idler 108 is biassed away from the capstan 41 by means of a spring 109. One end of the lever 107 carries an adjustable plate 110 which projects inwardly into register with the outer end of the slot 39. When the post is moved into the slot 39, as shown in Fig. 7*a*, it engages the plate 110 and swings the lever 107 so as to bring the rubber tired idler 108 into tape gripping relation with the capstan 41, as shown in Fig. 7*a*. The tape is thus caused to move at capstan speed to the left and is thus fed from reel 32 to reel 31 for recording or play-back. In all other positions of the post 35, the idler 108 is away from the capstan 41. A similar lever 111 is pivotally mounted at 112 on the plate 20. This lever carries a rubber tired idler 113 which is located on the other side of the tape from the capstan 42. The idler 113 is biassed away from the capstan 42 by means of a spring 114. The lever 111 also carries an adjustable plate 115 which projects to the left into register with the terminal portion of the post 35. When the post 35 is moved into the slot 40, the lever 111 is swung in the counterclockwise direction and the tape is gripped between the idler and the capstan 42, thus establishing the capstan drive to transfer tape from reel 31 to reel 32 for recording or play-back. In all other positions of the post 35, idler 113 is moved away from the capstan 42 by the spring 114.

Since the present machine is intended to record and reproduce from two sound tracks on the tape, we provide a recording or pickup magnet 116 to cooperate with the upper part of the tape and a recording or pickup magnet 117 cooperating with the lower part of the tape and erasing magnets 118 and 119 in alignment with the magnets 116 and 117, respectively. These magnets may be located in permanent engagement with the tape between the capstans 41 and 42 and switches 120 and 121 may be provided to control the connection of the magnets 116 and 118 or the magnets 117 and 119, respectively. The switches 120 and 121 may suitably be located within the housings 22 and 23, and they are arranged to be operated by plungers 122 and 123 which cooperate with lugs on the levers 107 and 111 in such manner that when the post 35 is located in the slot 39, the switch 120 is closed and the magnets 116 and 118 are connected and when the post 35 is located in the slot 40, the switch 121 is closed and the magnets 117 and 119 are connected.

We prefer to locate the magnets 116 to 119 normally out of engagement with the tape and to move them physically so that the magnets 116 and 118 are brought into engagement with the tape when it is moving to the left and the magnets 117 and 119 are brought into engagement with the tape when it is moving to the right. For this purpose, I assemble these magnets in a head 124 provided with two faces 125 and 126, the apex 127 between these two sides being normally directed forwardly as shown in Figs. 4, 5*a* and 6*a*. The two sides 125 and 126 are provided with a tape receiving groove 128 so that the tape is maintained in proper register with both pairs of magnets. The head 124 is rigidly secured to a plate 129 which is pivotally supported on the plate 20 at 130. The plate 129 is provided with three notches 131, 132 and 133. A roller 134 carried by a pin 135 is arranged to enter these notches. The pin and roller project upwardly through a slot 136 in the plate 20. The pin 135 is rigidly mounted on a member 137 which is slidably mounted on the underside of the plate 20 as shown in Figs. 10 and 11. The roller 134 is biassed by a spring 140, towards the plate 129, to enable it to cooperate with the three notches 131, 132 and 133. Thus, the head 124 may be located in its three positions shown in Figs. 4, 7*a* and 9. The head 124 is moved from one of these positions to another by means of the pin 102 carried by the member 75 and previously referred to. This pin projects upwardly through an opening 138 so as to cooperate with a large V-formation 139 in the plate 129. Normally, the apex 127 of the head is directed forwardly. When the post 35 is moved forwardly into register with the slots 37 and 38, the pin 102 is located rearwardly of the plate 129 as shown in Fig. 4, and consequently, the post 35 may be entered into the slot 37 or the slot 38 without affecting the normal position of the head 124, as shown in Figs. 5*a* and 6*a*. When, however, the post 35 is moved to its forward position, in register with the slots 39 and 40, the pin 102 is brought well into the V-shaped recess 139 in the plate 129 and consequently, when the post 35 is moved into the slot 39 or the slot 40, the pin 102 swings the head 124 into its position in Fig. 7*a* or into its position in Fig. 9, respectively. It will be readily understood that suitable exterior switching means are provided for optionally supplying erasing current to the magnets 118 and 119, for supplying recording current to the magnets 116 and 117 and for connecting the magnets 116 and 117 to serve as pickups during play-back. Since one pair of magnets is removed from the tape physically during recording or play-back, the magnets 116 and 117 may be connected in series or parallel and likewise, the magnets 118 and 119 may also be connected in series or in parallel.

The operation is as follows: The post 35 being in its position of Fig. 1, the head 124 is in its neutral position of Fig. 4, and the motor is latched out of operation, the roller 98 being located in the slot 99. The reels 31 and 32 are applied to the spindles 24 and 25 and the tape is introduced into the slot 44 into engagement with posts 106 and the apex 127 of the head 124. The handle 36 is moved forwardly to bring the post 35 into alignment with the slots 37 and 38, thus starting the motor. The belts 83 and 84 tend to drive the reels 31 and 32 in the clockwise and counterclockwise direction, respectively, but since the tensions of the belts are equalized, little or no movement of the tape results. It is ordinarily desired to start recording with most of the tape on one of the reels, for example, the reel 32, and for this purpose, the post 35 is moved into the slot 38. The tension of the belt 84 is increased and the tension of the belt 83 is decreased so that the tape is rapidly transferred onto the reel 32. This transfer is stopped by returning the post 35 to its central position. Recording signal is supplied to both magnets 116 and 117 and if the tape is not "clean," erasing current is supplied to the two magnets 118 and 119. The post 35 is then moved into slot 39 with the result that the idler 108 is moved towards the capstan 41 so that this capstan becomes operative to feed the tape at recording speed to the left. The tension on the belt 83 is increased somewhat so that the reel 31 takes up the tape supplied to its by the capstan 41. The tension on the belt 84 is decreased somewhat, but it still supplies sufficient force to the reel 32 to keep the tape taut. Also, the head 124 is brought into its position in Fig. 7*a* so that the magnet 116 applies recording signal to the upper part of the tape. The erasing magnet 118, preceding the magnet 116, cleans this part of the tape for the purpose of removing the old signal, if that is necessary.

When the reel 32 approaches depletion, the handle 36 is thrown to the right so as to bring the post 35 into the slot 40. The idler 108 is moved away from the capstan 41, rendering it inoperative and the idler 113 is moved towards the capstan 42 so that the tape is firmly held on this capstan and the direction of movement of the tape is instantaneously reversed. At the same time, the head 124 is moved from its position in Fig. 4*a*, into its position in Fig. 9, with the result that the magnets 116 and 118 are removed from the tape and the magnets 117 and 119 are brought into contact with the tape to record on the lower part thereof. It is to be noted that the motor and capstans and elements associated therewith, continue to operate at the same speed and in the same directions. The only elements which reverse their movement, are the tape and the reels 31 and 32. The masses involved and also their speed being both very low, the tape is reversed instantaneously so that no part of the recording is lost. Part of a word may be recorded on the upper sound track and another part of the same word may be recorded on the lower sound track.

The operation for play-back is substantially the same as for recording with the exception of exterior switching in accordance with well known magnetic recording technique. No erase current is supplied to the magnets 118 and 119 and the magnets 116 and 117 are connected so as to serve as pickup magnets cooperating with two sound tracks on the tape.

Although the present invention has been described in connection with the specific details of a preferred embodiment thereof, it must be understood that such details are not intended to be limitative of the invention except insofar as set forth in the accompanying claims.

Having thus described our invention, we declare that what we claim is:

1. A magnetic tape machine arranged to cooperate with two tracks on the tape, comprising two capstans, means for driving both capstans simultaneously so as to tend to drive the tape in opposite directions, means for gripping the tape to either capstan, a movable head arranged to engage the tape between said capstans and having a pair of magnets, each arranged to cooperate with one of the tracks, said head being arranged for movement to bring either magnet into engagement with the tape and the other magnet out of such engagement, and a control member arranged to bring the gripping means into cooperation with one capstan and to move the movable head to bring one magnet into engagement with the tape and to bring the gripping means into cooperation with the other capstan and move the movable head to bring the other magnet into engagement with the tape.

2. A magnetic tape machine arranged to cooperate with two tracks on the tape, comprising a pair of reels for the tape, two capstans located for engagement of the tape between the two reels, a movable magnet head located between said capstans and arranged to engage said tape, said head comprising two magnets at different levels to cooperate with the two tracks, said head being arranged for movement to bring either magnet into engagement with the tape and the other out of such engagement, a motor for driving both capstans simultaneously so as to tend to drive the tape in opposite directions, a friction drive connected between each reel and the motor, tending to drive each reel in tape take-up direction, means for gripping the tape to either capstan, a single control arranged to bring the gripping means into cooperation with either capstan and to move the movable head so as to bring the corresponding magnet into engagement with one track, and means actuated by the control for increasing the friction of the drive of the take-up reel and lessening the friction of the drive of the supply reel.

3. A magnetic tape machine arranged to cooperate with two tracks on the tape, comprising two capstans, means for driving both capstans simultaneously so as to tend to drive the tape in opposite directions, a gripping means associated with each capstan, a pivotally mounted head arranged to engage the tape between said capstans and having a pair of magnets, each arranged to cooperate with one of the tracks, said head being arranged for swinging movement to bring either magnet into engagement with the tape and the other magnet out of such engagement, and a control member arranged to bring either gripping means into cooperation with its capstan and to swing the movable head to bring the corresponding magnet into engagement with the tape and to bring the other gripping means into cooperation with its capstan and swing the movable head to bring the other magnet into engagement with the tape.

4. A magnetic tape machine arranged to cooperate with two tracks on the tape, comprising a pair of reels for the tape, two capstans located for engagement of the tape between the two reels, a pivotally mounted magnet head located to engage the tape between the capstans, said head comprising two magnets at different levels to cooperate with the two tracks, said head being arranged for swinging movement to bring either magnet into engagement with the tape and the other magnet out of such engagement, a motor for driving both capstans simultaneously so as to tend to drive the tape in opposite directions, a friction drive connected between each reel and the motor, tending to drive each reel in tape take-up direction, a gripping means associated with each capstan, a single control arranged to bring either gripping means into cooperation with its capstan and to swing the movable head so as to bring the corresponding magnet into engagement with one track, and means actuated by the control for increasing the friction of the drive of the take-up reel and lessening the friction of the drive of the supply reel.

5. A magnetic tape machine arranged to cooperate with two tracks on the tape, comprising two reels for tape, two capstans arranged to engage the tape between the reels, a motor for driving said capstans simultaneously so that they tend to drive the tape in opposite directions, friction drive means connecting each reel to the motor, whereby each reel tends to drive in tape take-up direction, a single control member movable into two actuated positions, means permitting movement of said control member laterally in opposite directions in each actuated position, means associated with the control member for increasing the tension of one friction drive and decreasing the tension of the other friction drive, when the control member is thus laterally displaced in one actuated position, for rapid transfer of tape from either reel to the other, a gripping means associated with each capstan, and means engageable by the control member when laterally displaced in the other actuated position for moving either gripping means into cooperation with its capstan.

6. A magnetic tape machine arranged to cooperate with two tracks on the tape, comprising means for guiding the tape in a path, a pivotally mounted magnet head having an apex, two sides diverging therefrom and a magnet in each of said sides located at different heights so that each is adapted to cooperate with one track, a control member having a neutral position and movable in one direction to effect feed of the tape in one direction and movable in another direction to effect movement of the tape in the opposite direction, and means operatively connecting said control member to said head, whereby the head is located with its apex directed towards the tape when the control member is in neutral position, one of said sides is brought into engagement with the tape when the control member is displaced in one direction and the other side of the head is brought into contact with the tape when the control member is displaced in the opposite direction.

References Cited in the file of this patent

UNITED STATES PATENTS

| | | |
|---|---|---|
| 2,221,661 | Woolf | Nov. 12, 1940 |
| 2,235,029 | Levinson | Mar. 18, 1941 |
| 2,266,755 | Herzig | Dec. 23, 1941 |
| 2,408,320 | Kuhlik | Sept. 24, 1946 |
| 2,467,507 | Stone | Apr. 19, 1949 |
| 2,524,064 | Masterson | Oct. 3, 1950 |
| 2,539,858 | Offutt | Jan. 30, 1951 |
| 2,547,737 | Blaney | Apr. 3, 1951 |
| 2,551,198 | Barrett | May 1, 1951 |
| 2,554,582 | Mallina | May 29, 1951 |
| 2,590,292 | Anderson | Mar. 25, 1952 |
| 2,604,549 | Begun | July 22, 1952 |
| 2,623,750 | Masterson | Dec. 30, 1952 |

FOREIGN PATENTS

| | | |
|---|---|---|
| 540,282 | Germany | Dec. 14, 1931 |